United States Patent [19]

Moriyama et al.

[11] Patent Number: 5,580,314
[45] Date of Patent: Dec. 3, 1996

[54] ENERGY ABSORBING INTERMEDIATE SHAFT

[75] Inventors: Seiichi Moriyama, Takasaki; Katsumi Saito; Daijiro Yamasaki, both of Maebashi, all of Japan

[73] Assignee: NSK Ltd., Tokyo, Japan

[21] Appl. No.: 328,766

[22] Filed: Oct. 27, 1994

Related U.S. Application Data

[63] Continuation-in-part of Ser. No. 139,108, Oct. 21, 1993, abandoned.

[30] Foreign Application Priority Data

Mar. 29, 1993 [JP] Japan .................................. 5-020047
May 20, 1994 [JP] Japan .................................. 6-106672

[51] Int. Cl.$^6$ .................................................. F16C 3/03
[52] U.S. Cl. .......................... 464/162; 74/492; 280/777; 464/179
[58] Field of Search .................................. 464/114, 117, 464/32, 162, 179, 182; 280/777; 74/492

[56] References Cited

U.S. PATENT DOCUMENTS

| | | | |
|---|---|---|---|
| 3,600,970 | 8/1971 | Loofburrow | 74/492 |
| 4,019,403 | 4/1977 | Kondo et al. | 74/492 |
| 4,255,986 | 3/1981 | Mukoyama | 74/492 |
| 5,086,661 | 2/1992 | Hancock | 464/89 |
| 5,222,913 | 6/1993 | Nagashima | 280/777 |
| 5,228,720 | 6/1993 | Sato et al. | 280/777 |
| 5,230,658 | 6/1993 | Burton | 464/162 |

FOREIGN PATENT DOCUMENTS

| | | |
|---|---|---|
| 59-100661 | 7/1984 | Japan . |
| 60-161671 | 10/1985 | Japan . |
| 3-79472 | 4/1994 | Japan . |
| 6-227404 | 8/1994 | Japan . |

Primary Examiner—Daniel P. Stodola
Assistant Examiner—Eileen A. Dunn
Attorney, Agent, or Firm—Shapiro and Shapiro

[57] ABSTRACT

In order to obtain sufficient energy absorbing capacity and, at the same time, to reduce the number of components and simplify assembly, synthetic resin is disposed between a shaft and a tube. The synthetic resin is torn and broken when strong compressive force in the axial direction is given at the time of a car crash, allowing the shaft to be pushed deeply into the tube until it contacts a pin. In this state, the contact position between one end of the tube and a cover tube substantially coincides with a small-cross-section portion formed in an intermediate part of the shaft. As a result, the shaft can bend at the small-cross-section portion.

22 Claims, 11 Drawing Sheets

ENERGY ABSORBING INTERMEDIATE SHAFT

This is a continuation-in-part of application Ser. No. 08/139,108 filed Oct. 21, 1993, now abandoned.

BACKGROUND OF THE INVENTION

1. Field of the Invention

The present invention relates to an energy absorbing intermediate shaft which is built into a steering system of an automobile in order to transmit the movement of a steering wheel to a steering gear.

2. Related Background Art

In order to transmit the movement of a steering wheel to a steering gear, a steering system for an automobile has the constitution shown in FIG. 9. As shown in FIG. 9, a steering wheel 2 is fixed to the upper end of a steering shaft 1, and a steering column 3 is fixed under an instrument panel 6 with an upper bracket 4 and a lower bracket 5. Said steering shaft 1 is rotatably set through the steering column 3. The lower end of the steering shaft 1 which protrudes from the lower open end of the steering column is connected via a first universal joint 7 with the upper end of an intermediate shaft 8. Further, the lower end of the intermediate shaft 8 is connected via a second universal joint 9 with the input shaft 10 of a steering gear (not shown).

In the above-mentioned constitution, the rotation of the steering wheel 2 is transmitted through the steering shaft 1 inserted through the steering column 3, the first universal joint 7, the intermediate shaft 8, the second universal joint 9, the input shaft 10, and finally, to the steering gear, thereby giving a steering angle to wheels.

Generally, in the steering system having the constitution described above, the steering column 3, the steering shaft 1 and the intermediate shaft 8 are of the energy absorbing type which, when given an impact, absorb the energy of the impact and shorten their overall lengths in order to protect the driver at the time of a car crash. For example, Japanese Laid-Open Patent Appln. No. 3-79472 discloses one of the typical energy absorbing intermediate shafts.

This typical energy absorbing intermediate shaft disclosed the above Laid-Open Patent consists of four components which are assembled together, as shown in FIG. 10. One end (the left end in FIG. 10) of a shaft 11 and a yoke 12 which constitutes a universal joint are welded together. On the periphery near the other end of the shaft 11, male splines 13 are formed. Two concave grooves 14a and 14b are formed around the periphery on which said male splines 13 are formed.

Female splines 16 are formed on the inner periphery of a connection tube 15, which has three through holes 17a, 17b and 17c penetrating from the inner periphery to the outer periphery of the connecting tube 15. These through holes are separately aligned in the axial direction, wherein the distance between the through holes 17a and 17b is the same as the distance between the above-mentioned grooves 14a and 14b.

On the periphery of a connecting shaft 18, male splines 19 are formed. Two grooves 14c and 14d are formed around the periphery on which the male splines 19 are formed.

One end of a tube 20 is an open end, while the other end thereof and a yoke 21 which constitutes another universal joint are welded together. The tube 20 also has a through hole 17d penetrating from the inner periphery to the outer periphery of the tube 20. The distance between the through hole 17d and the above-mentioned through hole 17c when said connecting tube 15 attaches against the tube 20 is the same as the distance between the grooves 14c and 14d formed around the periphery of the connecting shaft 18. Further the depth D from the open end of the tube 20 to the end face of the yoke 21 is the same as the length L of the connecting shaft 18 (D=L).

These components 11, 15, 18 and 20 formed as described above are assembled together as shown in FIG. 11, and are fixedly set to each other by injecting synthetic resin 22a–22d through the through holes 17a–17d into the grooves 14a and 14d and then curing the synthetic resin. As the synthetic resin 22a–22d injected through respective through hole 17a–17d fills the entire grooves 14a–14d and cures therein, the components 11, 15, 18 and 20 are fixedly set to each other so that they can neither rotate around the axis nor shift in the axial direction. Note that a clearance A between the right end face of the shaft 11 and the left end face of the connecting shaft 18 and a clearance B between the right end face of the connecting shaft 18 and the end face of the yoke 21 are formed when the components 11, 15, 18 and 20 are assembled together as described above. The connecting shaft 18 which connects the connecting tube 15 with the tube 20 not only transmits torque between the tubes 15 and 20 but also prevents the contact position of the tubes 15 and 20 from bending.

When a car which has the intermediate shaft 8 constructed as shown in FIG. 11 built in its steering system crashes and the front thereof is collapsed, the second adjustable joint 9 including said yoke 12 is pushed backwards (rightwards in FIG. 11), thereby giving large compressive force in the axial direction to the intermediate shaft 8. By this compressive force, first, the synthetic resins 22a and 22b bonding the shaft 11 and the connecting tube 15 are torn and broken. Then, the shaft 11 shifts backwards by the length of said clearance A and the right end face of the shaft 11 comes in contact with the left end face of the connecting shaft 18.

When the shaft 11 in the above state is further pushed backwards, the synthetic resins 22c and 22d bonding the connecting shaft 18 to the connecting tube 15 and the tube 20 are torn and broken. Then, the connecting tube 15 relatively shifts by the length of said clearance B and the right end face of the connecting shaft 18 and the end face of the yoke 21 come in contact with each other. In this state, the open end of the tube 20 and the left end face of the connecting shaft 18 come in the same plane, and bearing capacity of the connecting shaft 18 which connects the tube 20 with the connecting tube 15, (that is, which prevents the contact portion of the tubes 20 and 15 from bending) disappears.

As a result, the shaft 11 and the connecting shaft slip off and separate from each other. After that, the shaft 11 does not push backwards the connecting shaft 18 nor the tube 20. Accordingly, even if the second universal joint 9 is further pushed backwards at the time of the car crash, the first universal joint 7 is not pushed backwards. Thus, as the steering wheel 2 does not protrude toward the driver, it cannot hurt the driver.

As for the above-mentioned typical energy absorbing intermediate shaft, however, since the four separately prepared components 11, 15, 18 and 20 are first assembled together at predetermined positions and then are fixedly set to each other with synthetic resin 22a–22d, the assembly operation is difficult and the manufacturing cost necessarily rises.

In addition, since two separately prepared shaft members, that is, the shaft 11 and the connecting shaft 18, constitute the shaft, at least three fixing points should be provided in order to fixedly connect the shafts 11 and 18 with the connecting tube 15 and the tube 20. In order to provide said fixing points, the shafts 11 and 18 should have certain lengths of engagement with the tubes 15 and 20. In short, when more fixing force is required, the overall length of the intermediate shaft 8 becomes longer. In such a case, troubles arise. For example, it becomes difficult to arrange the intermediate shaft 8 between the first and second universal joints and obtain sufficient clearances for collapse inside the intermediate shaft 8.

SUMMARY OF THE INVENTION

An object of the present invention is to provide an energy absorbing intermediate shaft which consists of less components and whose assembly operation is simplified. Thus, the manufacturing cost thereof can be reduced.

The energy absorbing intermediate shaft according to the present invention may comprise: a tube; a shaft which is inserted in the tube from the open end thereof and fixedly set thereto so as not to rotate inside the tube; and a displacement restricting portion which is formed between said shaft and said tube so that the shaft and the tube can shift in the axial direction only when strong force in the axial direction is given.

More specifically, the energy absorbing intermediate shaft according to the present invention may further comprise: a stopper portion which is formed at the other end of said tube in order to restrict the amount of insertion of said shaft into the tube; a small-cross-section portion formed in the intermediate part, which is not inserted in the tube, of the shaft; and a reinforcing member which is provided around the shaft so as to entirely cover said small-cross-section portion and which can slide in the axial direction, wherein the length of the tube is determined so that the open end of the tube comes to the position which Coincides with said small-cross-section portion when the end portion of the shaft bumps against said stopper portion.

As the energy absorbing intermediate shaft according to the present invention has the above-mentioned constitution, the reinforcing member normally covering the small-cross-section portion in the middle part of the shaft prevents the shaft from bending at said small-cross-section portion.

When strong compressive force is given in the axial direction at the time of the car crash, however, the shaft is pushed into the tube against restrictive force of the displacement restricting portion until the end portion of the shaft comes into contact with the stopper portion. At the same time, the open end of the tube pushes the reinforcing member away from the small-cross-section portion until the open end of the tube coincides with the small-cross-section portion.

In said state, if further compressive force is given, the shaft bends at its small-cross-section portion so as to prevent impact force given through the front end of the energy absorbing intermediate shaft from being transmitted toward the rear end of the intermediate shaft.

BRIEF DESCRIPTION OF THE DRAWINGS

FIGS. 6A and 6B, show another example of the small-cross-section portion in the middle part of the shaft, wherein FIG. 6A is a side view and FIG. 6B is a cross-sectional view cut and seen as indicated by the arrows VIB in FIG. 6A.

DESCRIPTION OF THE PREFERRED EMBODIMENTS

Figure 1:
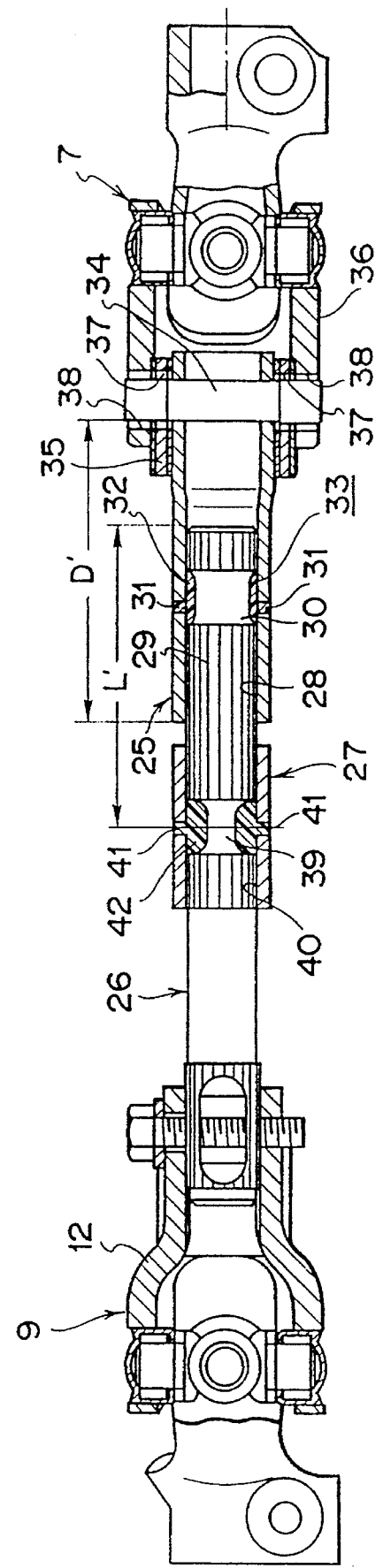
FIG. 1 is a cross-sectional view showing an embodiment according to the present invention.

FIGS. 1 to 5 show an embodiment according to the present invention. As shown in FIG. 1, the energy absorbing intermediate shaft of the present invention consists of a tube 25, a shaft 26 and a cover tube serving as a reinforcing member. On the inner periphery near one end (left end in FIG. 1) of the tube 25, female splines 28 are formed. On the outer periphery near one end (right end in FIG. 1) of the shaft 26, male splines 29 are formed. The shaft 26 is inserted into the tube 25 from said open end of the tube 25, when the female splines 28 and the male splines 29 are engaged with each other. A concave groove 30 is formed around the outer periphery near the right end of said shaft 26, while through holes 31 are formed in the middle portion of the tube 25 so as to correspond to the groove 30. A displacement restricting portion 33 is formed by injecting synthetic resin 32 via two through holes 31 into the groove 30. The displacement restricting portion 33 allows the shaft 26 to shift in the axial direction in the tube 25 only when strong force in the axial direction is given to said members 25 and 26. In the embodiment shown in the drawings, when the shaft 26 is pushed in the axial direction (rightwards in FIG. 1) into the tube 25 after stuffing the synthetic resin 32, the synthetic resin is torn and broken between the through holes 31 and the groove 30. Accordingly, the displacement restricting portion 33 restricts displacement between the tube 25 and the shaft 26 only by means of frictional force of the synthetic resin 32 acting between the inner periphery of the tube 25 and the outer periphery of the shaft 26. To the right end portion of the tube 25, a pin 34 is fixedly set, which serves as the stopper portion for restricting the amount of insertion of the shaft 26 into the tube 25. Both ends of the pin 34 protrude from the outer periphery near the right end of the tube 25, and are loosely inserted through round holes 37 formed in a buffer tube 35 as well as round holes 38 formed in a yoke 36 which constitutes a first universal joint 7.

A small-cross-section portion 39 is formed in the intermediate part, which is not inserted in the tube 25, of the shaft 26. The diameter of the small-cross-section portion 39 is considerably smaller than that of the other part of the shaft 26. The above-mentioned male splines 29 are extended over both sides of the small-cross-section portion 39. The cover tube 27 is positioned so as to entirely cover the small-cross-section portion 39.

On the inner periphery of the cover tube 27, female splines 40 to be engaged with said male splines 29 are formed. Thus, when the cover tube 27 is supported around the shaft 26, the cover tube 27 can slide only in the axial direction. Further, through holes 41, through which the inner periphery and the outer periphery of the cover tube 27 communicate with each other, are formed in the intermediate part of the cover tube 27. Synthetic resin 42 is injected into the clearance formed between the small-cross-section portion 39 and the cover tube 27 through these through holes 41.

Further, the depth D' from the open end of the tube 25 to the side of the pin 34 is determined to be equal to the length L' from the right end of the shaft 26 to the middle of the small-cross-section portion 39 (D'=L'). Accordingly, when the right end of the shaft 26 bumps against the side of the pin 34, the open end of the tube 25 and the middle of the small-cross-section portion 39 substantially coincide with each other.

In the above-mentioned constitution of the energy absorbing intermediate shaft according to the present invention, a yoke 12 of a second universal joint 9 is fixedly set to the left end of the shaft 25, while the yoke 36 of a first universal joint 7 is supported via the buffer tube 35 around the right end of the tube 25. Incidentally, when torque is small, it is transmitted between the tube 25 and the yoke 12 through the buffer tube. But when the torque is large, it is transmitted by means of engagement of both ends of the pin 34 with the inner surfaces of respective round holes 38.

Figure 2:
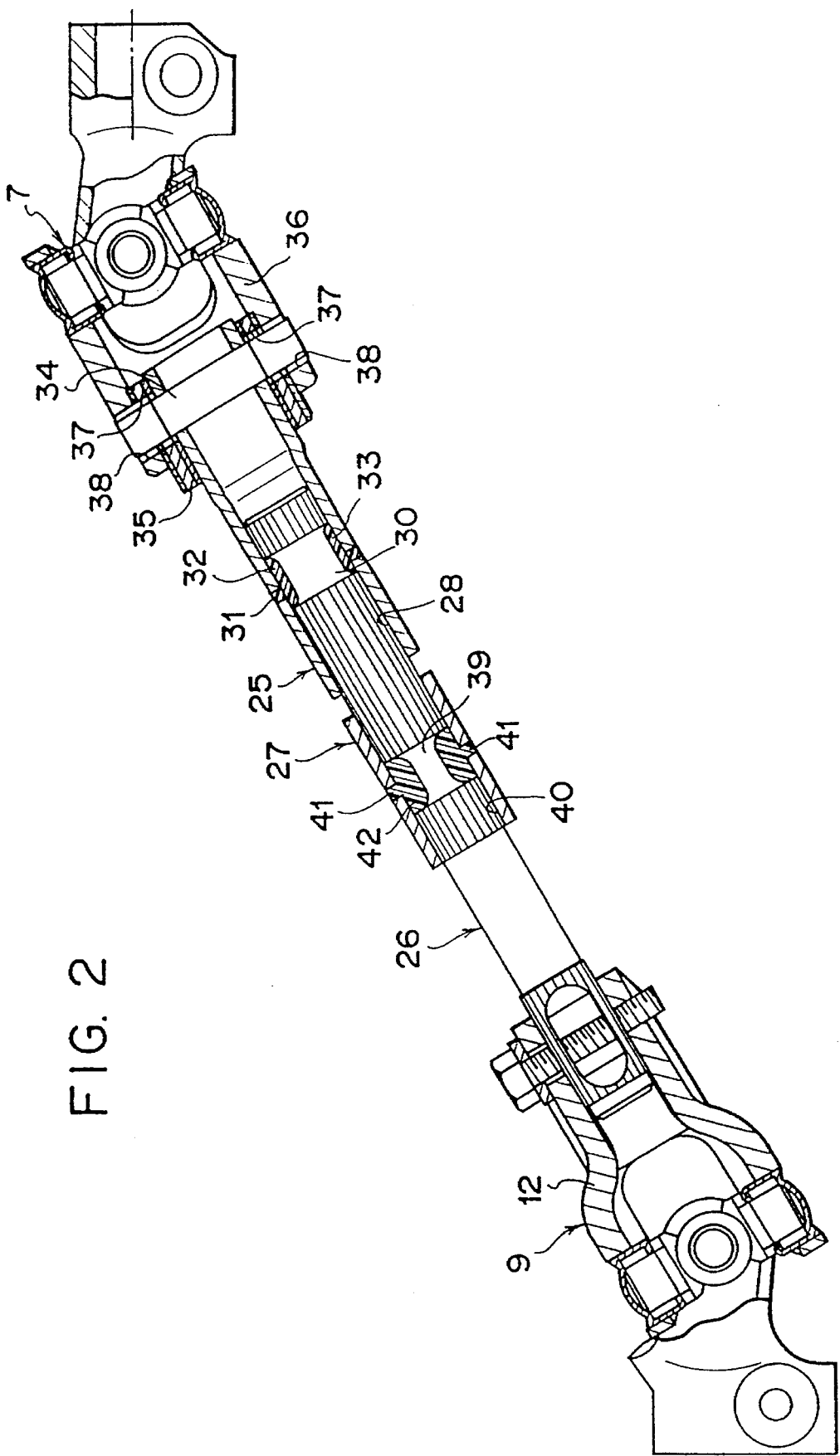
FIG. 2 is a cross-sectional view showing the same embodiment built into a steering system.
Figure 9:
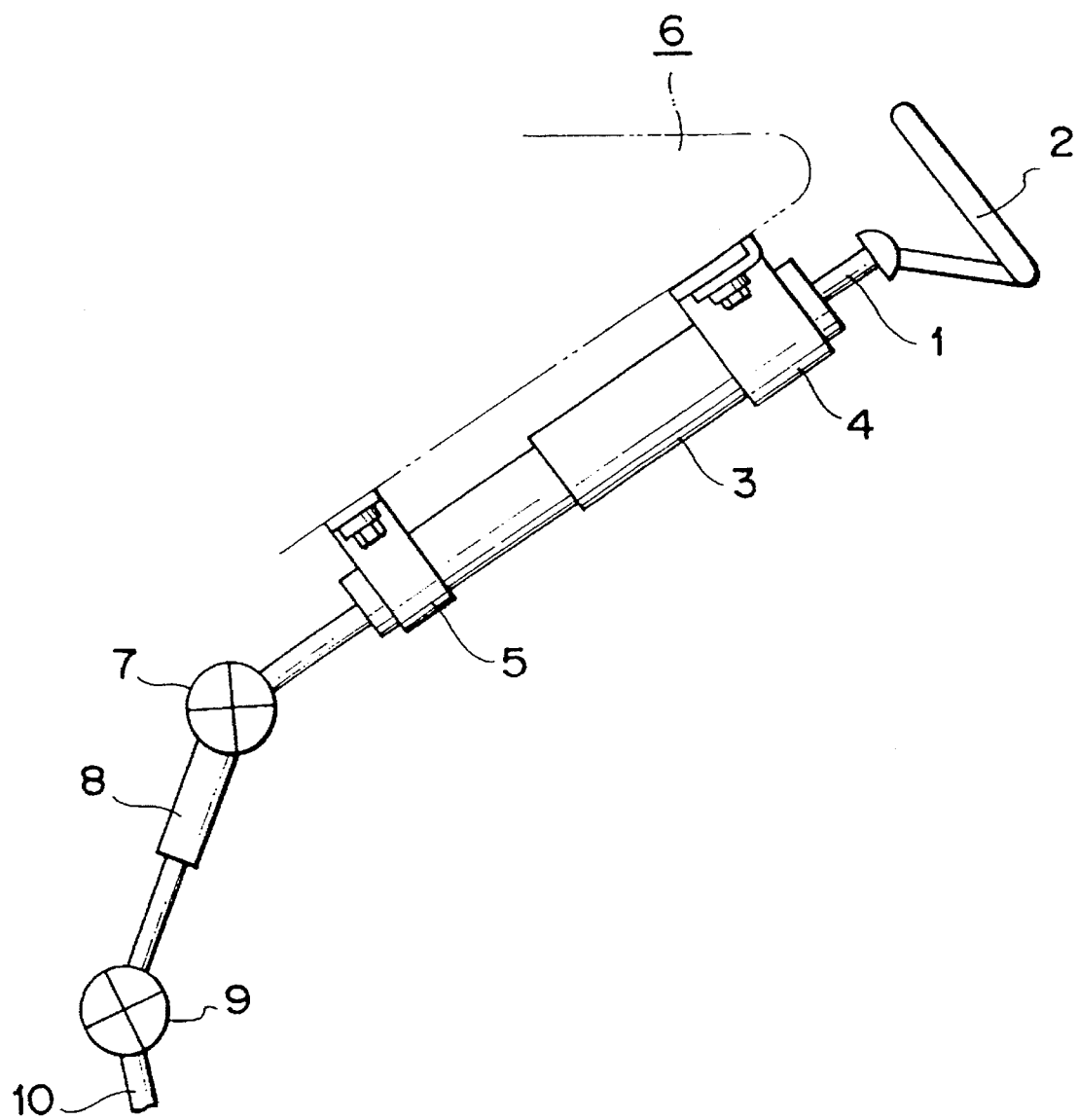
FIG. 9 is a side view showing an example of a steering system to which the energy absorbing intermediate shaft according to the present invention is applied.
Figure 10:
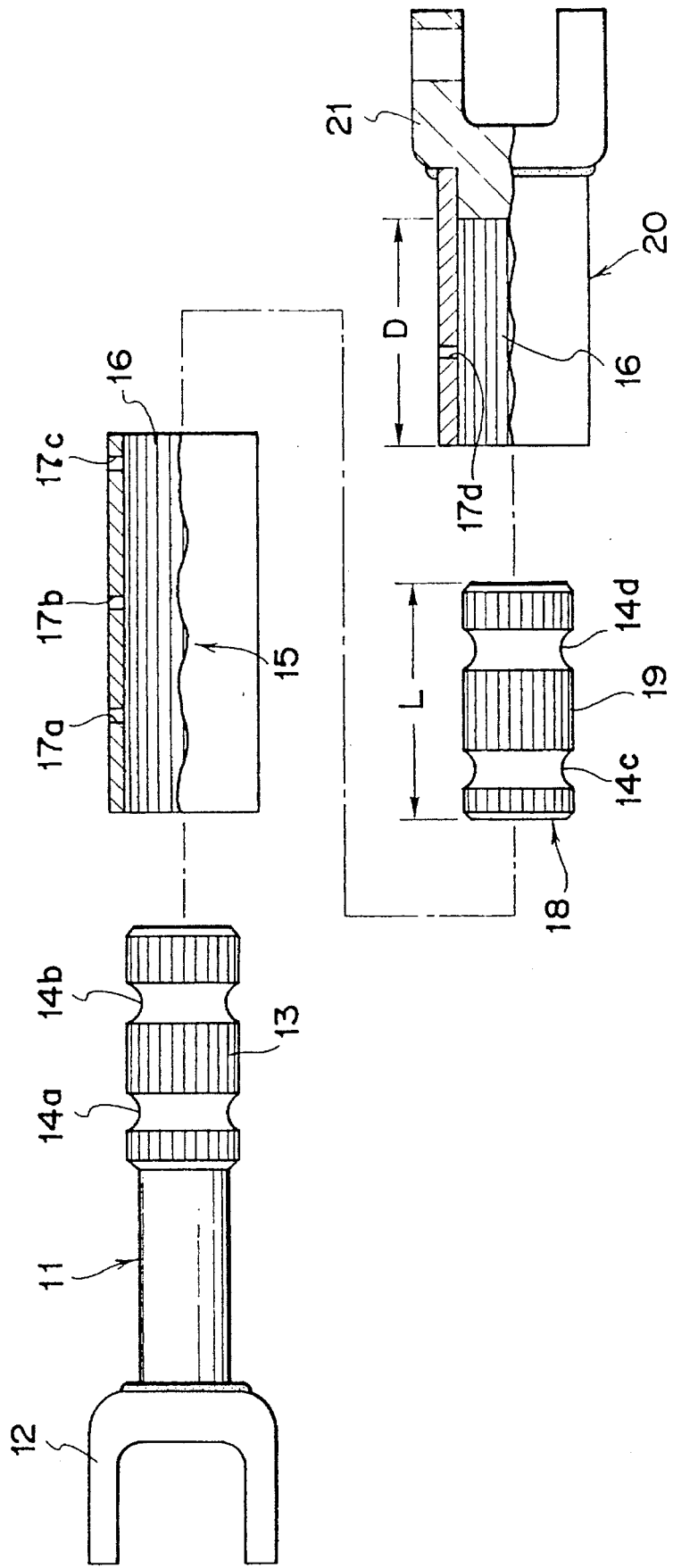
FIG. 10 is a partial cross-sectional view showing components of a typical intermediate shaft before assembly.
Figure 11:
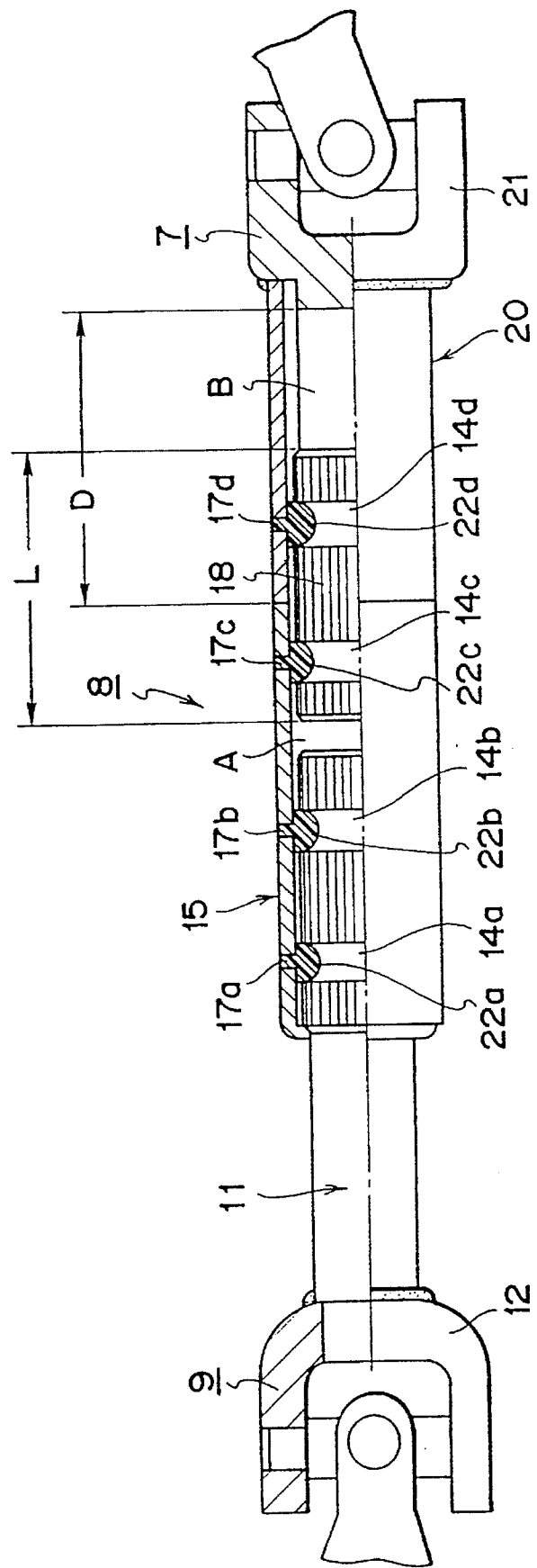
FIG. 11 a partial cross-sectional view showing the components shown in FIG. 10 after assembly.

The energy absorbing intermediate shaft according 1 to the present invention having the above-mentioned constitution is positioned on a slant, as shown in FIG. 2, wherein one end thereof (the front end with respect to a car body) is connected via the second universal joint 9 with an input shaft 10 (see FIG. 9) of a steering gear and the other end (the rear end) is connected via the first universal joint 7 with a steering shaft 1 (FIG. 9). In this state, when the driver handles a steering wheel 2, the rotational motion of the steering shaft 1 is transmitted through the first adjustable joint 7 to the tube 25, and further through the shaft 26 to the second universal joint 9, which, in turn, rotates the input shaft 10 in order to give a desirable steering angle to front wheels.

During said operation of giving the steering angle, the shaft 26 receives torque. But, since the cover tube 27 is supported by the intermediate part of the shaft 26 in order to cover the small-cross-section portion 39, and since the female splines 40 on the inner periphery of the cover tube 27 are engaged with the male splines 29 on the outer periphery of the shaft 26, the small-cross-section portion 39 does not receive excessive stress; nor is it broken. In addition, since the synthetic resin 42 is stuffed around the small-cross-section portion 39 and further the cover tube 27 covers the synthetic resin 42, the shaft 26 does not bend at the small-cross-section portion 39 even if force which would otherwise bend the shaft 26 is given to the shaft 26.

Figure 3:
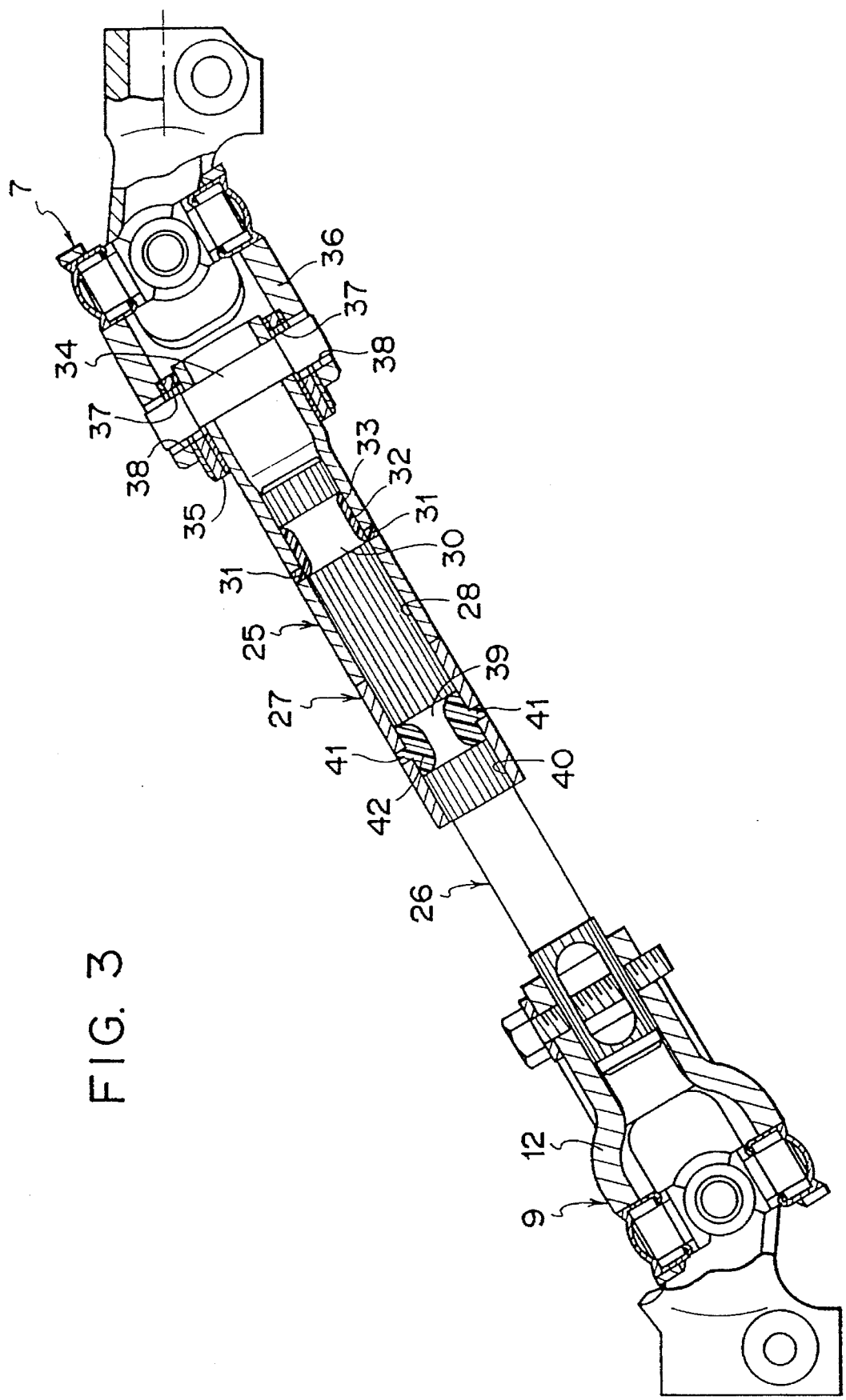
FIG. 3 is a cross-sectional view showing the state of the intermediate shaft in a first at the time of a car crash.

When the front of an automobile collapses at the time of the car crash, said second universal joint 9 is pushed backwards (rightwards in FIG. 2), that is, the energy absorbing intermediate shaft receives strong compressive force in the axial direction. In this case, at first, the shaft 26 is further pushed into the tube 25 against frictional force given by the displacement restricting portion 33, as shown in FIG. 3. The left end of the tube 25 and the right end brink of the cover tube 27, which have been separated from each other as shown in FIGS. 1 and 2, come into contact with each other.

Figure 4:
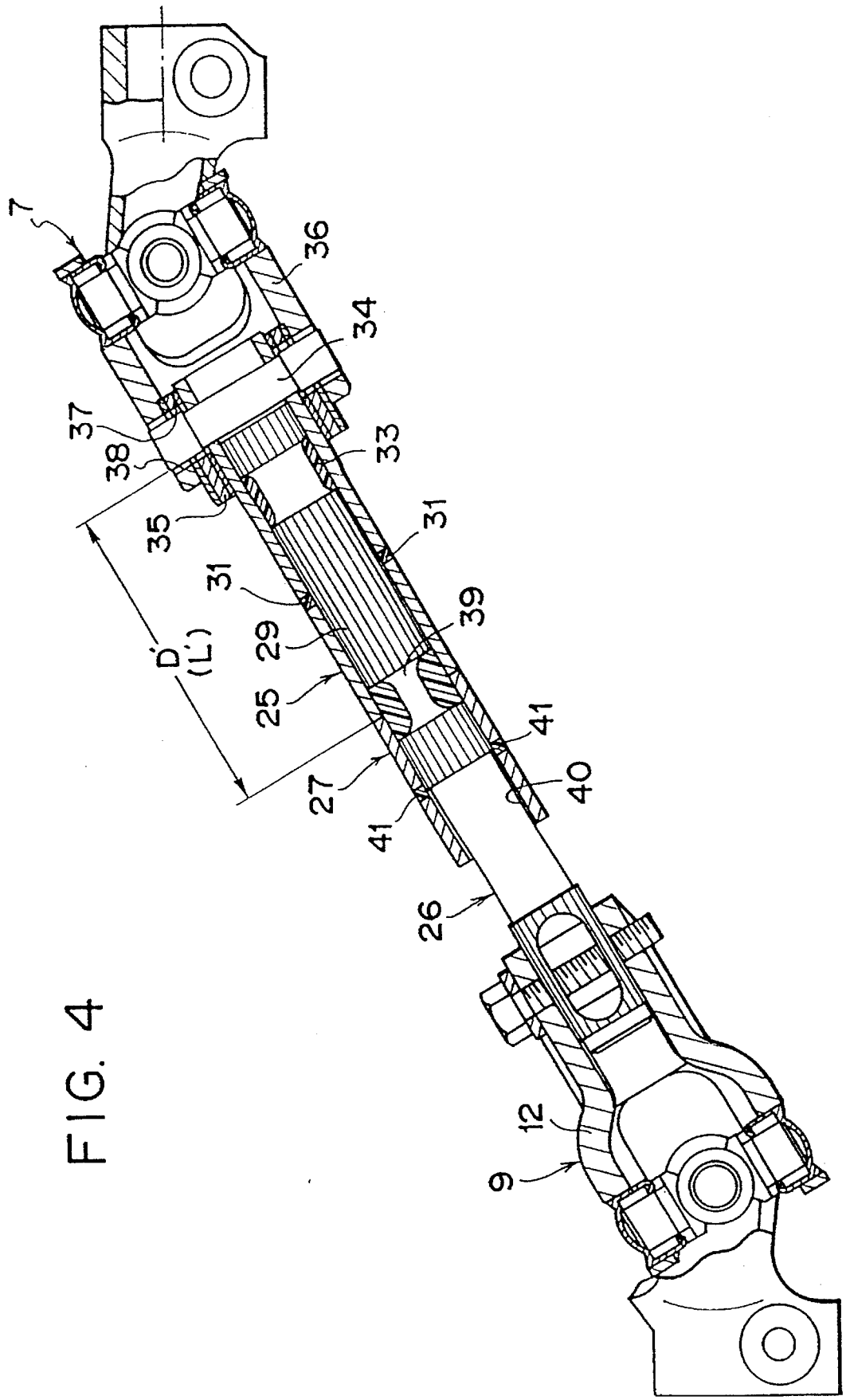
FIG. 4 is a cross-sectional view showing the state of the same in a second stage.

When the second universal joint 9 in said state is further pushed backwards, the synthetic resin 42 stuffed around the small-cross-section portion 39 is torn and broken against the inner edges of the through holes 41. As shown in FIG. 4, the shaft is pushed into the tube 25 until the right end of the shaft bumps against the side of the pin 34. At the same time, the left end of the tube 25 pushes the cover tube 27 away from the small-cross-section portion 39 until the left end of the tube 25 and the small-cross-section portion 39 substantially coincide with each other.

Figure 5:
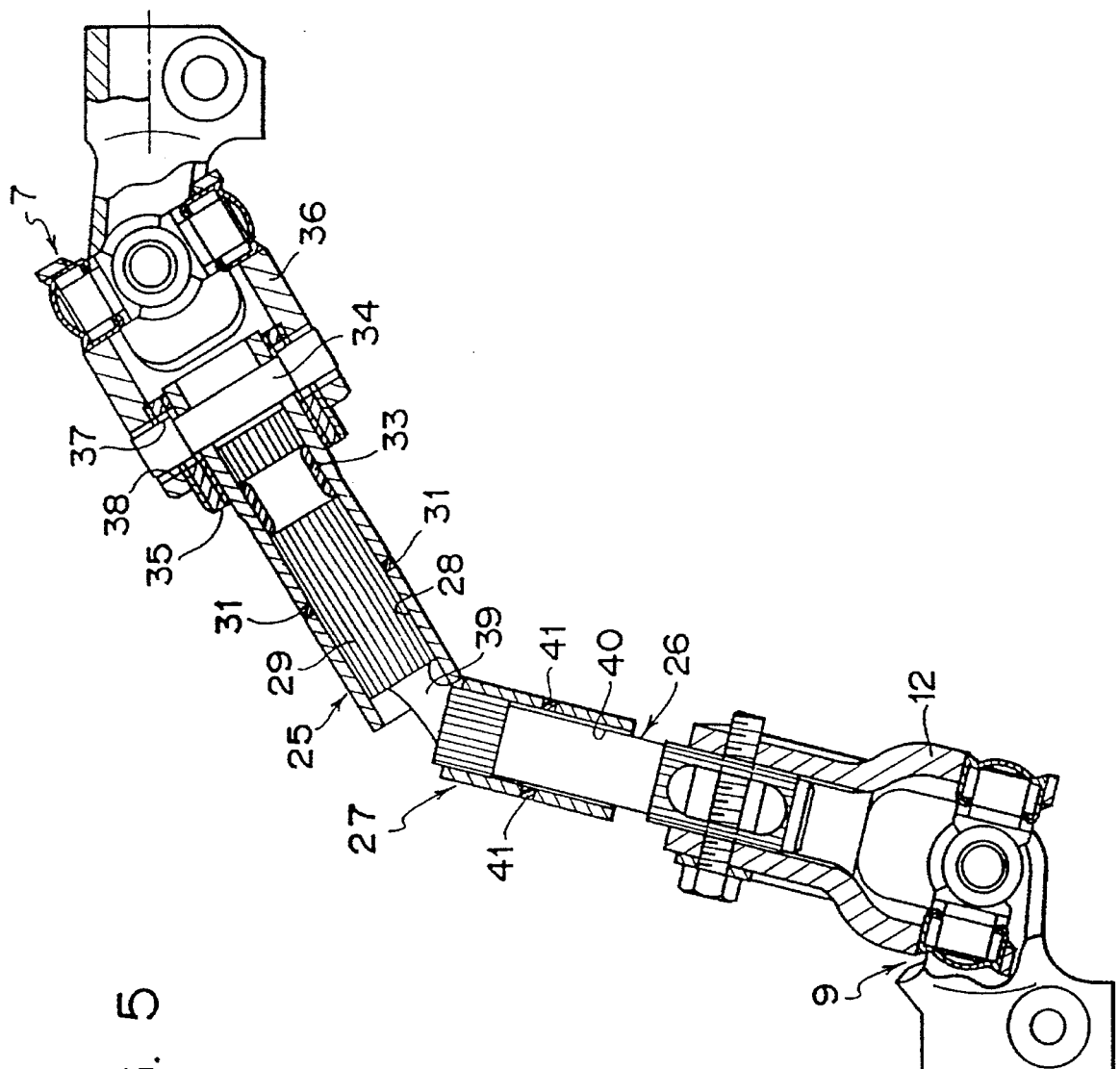
FIG. 5 is a cross-sectional view showing the state of the same in a last stage.

When the shaft 26 in the above state further receives the compressive force in the axial direction, the shaft 26 bends at the small-cross-section portion 39, as shown in FIG. 5, thereby preventing impact force given from the second universal joint 9 to the front end of the energy absorbing intermediate shaft from being transmitted to the first universal joint attached to the rear end of the intermediate shaft. Incidentally, the synthetic resin 42 stuffed around the small-cross-section portion 39 is smashed and falls down when the shaft 26 bends at the small-cross-section portion 39.

Figure 6A:
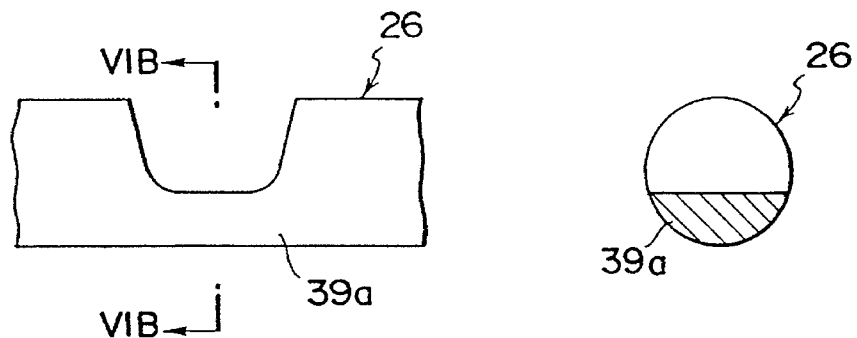
Figure 6B:
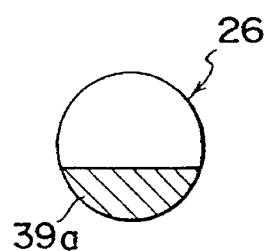

The shape of the small-cross-section portion 39 formed in the intermediate part of the shaft 26 is not limited to the constriction having a smaller diameter than the other part of the shaft as shown in FIGS. 1 to 5. The small-cross-section portion can be formed so as to have a crescent shaped section which is eccentric with respect to the center of the shaft 26, as shown in FIGS. 6A and 6B. A small-cross-section portion 39a having such a shape can bend even with relatively small compressive force given to the shaft 26 when the reinforcing member (the cover tube 27) retreats from the small-cross-section portion 39a.

Figure 7:
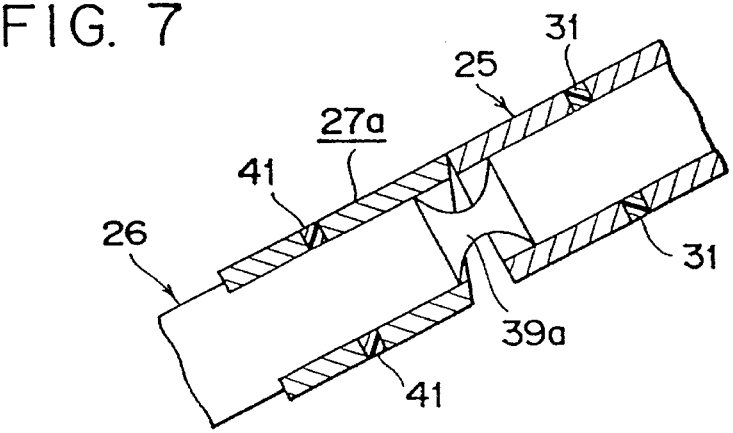
FIG. 7 is a cross-sectional view of another example of the shape of the cover tube, which shows its state in the second stage (as in FIG. 4).
Figure 8:
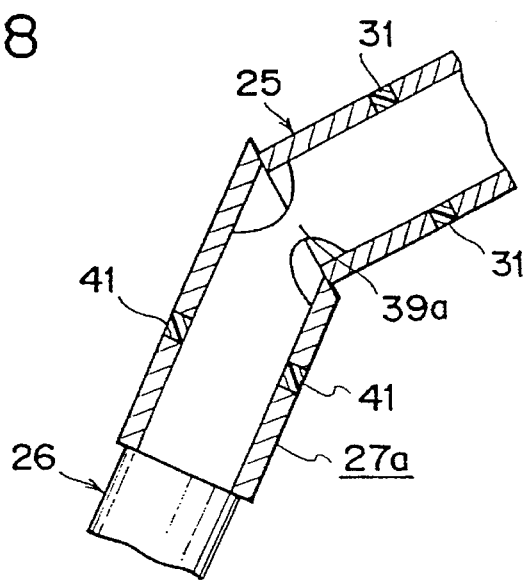
FIG. 8 is a cross-sectional view showing the cover tube shown in FIG. 7 which shows its state in the last stage (as in FIG. 5).

Additionally, as shown in FIGS. 7 and 8, for example, if the right edge of a cover tube 27a is formed so as to be slanted and the amount of displacement of the cover tube 27a toward the left end of the shaft 26 is properly restricted, the shaft 26 can bend even with relatively small compressive force given to the shaft 26 when the reinforcing member (the cover tube 27a) retreats from the small-cross-section portion 39. Instead of slanting the right edge of the cover tube 27a, the left edge of the tube 25 may be formed so as to be slanted in order to obtain a similar effect. In addition, though not shown in the drawings, well known mechanisms for forbidding the shaft to rotate inside respective tubes can be employed instead of engagement with splines; for example, a flat portion formed in the shaft may be engaged with corresponding flat portions formed in the tubes to obtain a similar effect.

Incidentally, the cover tube 27 can be normally forbidden to move along the shaft 26 in the axial direction not only by means of the synthetic resin 42 shown in FIGS. 1 to 4 but also by other mechanisms. For example, the shaft 26 may be forcibly pushed into the cover tube 27 with a very small interference between the tube and the outer periphery of the shaft 26; a pair of O-rings or a pair of C-shaped elastic metal rings may be set around the outer periphery of the shaft 26 so as to hold the cover tube 27 therebetween; or steel ball(s) may be forcedly pushed into a groove (grooves) formed along the axial direction on either the inner periphery of the cover tube 27 or the outer periphery of the shaft 26.

As the energy absorbing intermediate shaft according to the present invention has the above-mentioned constitution and operates as described above, it is possible to exhibit sufficient energy absorbing capacity, and at the same time, to reduce the number of components and simplify the assembly operation in order to reduce the manufacturing cost.

According to the energy absorbing intermediate shaft of the above-mentioned embodiment, the torque generated by a steering operation is transmitted from the rear part (from the right in FIG. 1) of the shaft 26 to the front part (to the left in FIG. 1) of the same via the cover tube 27. Clearances between the female splines 28 on the inner periphery of a tube 25 and the male splines 29 on the outer periphery of the shaft 26 can not be avoided on account of the accuracy of machining employed. Therefore, the torque of steering operation may rotate the shaft 26 through a small angle in the cover tube 27 because of said clearances. In this case, said torque rotating the shaft 26 in the small angle is not transmitted through the cover tube 27 but through the small-cross-section portion 39 of the shaft 26 surrounded by the cover tube 27.

As the rigidity of the small-cross-section portion 39 is small, the portion 39 is twisted and elastically deformed when torque is transmitted. When the amount of elastic deformation caused by torque is large and the small-cross-section portion 39 is repeatedly twisted, damage such as cracks may occur because of metal fatigue of the small-cross-section portion 39. If the clearances between the female splines 28 and the male splines 29, that is, the amount of said elastic deformation were decreased, the above-mentioned damage could be avoided. But, as the male splines 29 must smoothly slide in the female splines 28 at the time of the car crash, the clearances should be decreased with high dimensional accuracy, which undesirably raises the manufacturing cost of the energy absorbing intermediate shaft.

Another embodiment was devised in order to solve the above-mentioned problem. The energy absorbing intermediate shaft of this embodiment is the same as that of the above-mentioned embodiment in that it comprises: a tube; a shaft which is inserted in the tube from the open end thereof and fixedly set thereto so as not to rotate inside the tube; a displacement restricting portion which is formed between said shaft and said tube so that the shaft and the tube can shift in the axial direction only when strong force in the axial direction is given; a stopper portion which is formed at the other end of said tube in order to restrict the amount of insertion of said shaft into the tube; a small-cross-section portion having a circular cross-section formed in the intermediate part, which is not inserted in the tube, of the shaft; and a reinforcing member which is provided around the shaft so as to entirely cover said small-cross-section portion and which can slide only in the axial direction. The length of the tube of this embodiment is also determined so that the open end of the tube comes to the position which coincides with said small-cross-section portion when the end portion of the shaft bumps against said stopper portion.

The energy absorbing intermediate shaft of this embodiment is, however, characterized in that the diameter of said small-cross-section portion is determined to be ¼ to ½ of that of said shaft and that the length of the small-cross-section portion is determined to be twice as great as or greater than the diameter of the same.

Like the energy absorbing intermediate shaft of the embodiment described before, the reinforcing member of this embodiment normally covering the small-cross-section portion in the middle part of the shaft prevents the shaft from bending at the small-cross-section portion. When strong compressive force in the axial direction is given at the time of the car crash, however, the shaft is pushed into the tube against restrictive force of the displacement restricting portion until the end portion of the shaft comes into contact with the stopper portion. At the same time, the open end of the tube pushes the reinforcing member away from the small-cross-section portion until the open end of the tube coincides with the small-cross-section portion. In said state, if further compressive force is given, the shaft bends at its small-cross-section portion so as to prevent impact force given through the front end of the energy absorbing shaft from being transmitted toward the rear end of the intermediate shaft.

Especially in the case of the energy absorbing intermediate shaft of the present embodiment, the small-cross-section portion formed as described above does not suffer from excessive force even when the shaft is rotated through a small angle inside the reinforcing member. More specifically, as the diameter of the small-cross-section portion is determined to be ¼ to ½ of that of the shaft and the length of the small-cross-section portion is determined to be at least twice as great as the diameter of the same, only small stress is generated in the small-cross-section portion when the torque elastically deforms the small-cross-section portion. As a result even when torque is repeatedly given, the occurrence of damage of the small-cross-section portion caused by metal fatigue can be reduced. Therefore, the portions of the reinforcing member and those of the shaft which function as a rotation inhibiting mechanism do not have to be machined with high dimensional accuracy, which reduces the manufacturing cost of the energy absorbing intermediate shaft. Now, the present invention will be described below in detail.

FIGS. 12 to 15 show the present embodiment according to the invention. As described above, the present embodiment is characterized in that a part of the energy absorbing intermediate shaft, that is, the small-cross-section portion, is modified from that of the above-mentioned embodiment. The dimensions of the small-cross-section portion 39a are determined so that metal fatigue is not accumulated in the small-cross-section portion 39a after long-term use. Many of the other parts having structures and functions similar to those of the embodiment described before are indicated by the same reference numerals, and detailed description thereof will be omitted. In the following, the characteristic parts and portions of this embodiment will mainly be described.

In the middle part of the shaft 26 in the energy absorbing intermediate shaft of the present embodiment, the small-cross-section portion 39a having a diameter smaller than that of the other parts of the shaft 26 is formed concentrically with respect to the shaft 26. That is, the small-cross-section portion 39a is cylindrical and its axis coincides with that of the shaft 26. The ends of the small-cross-section portion 39a are linked with the main body portions of the shaft 26 via arcuate portions 43. As shown in the drawings, two grooves 44 are formed on both sides of the small-cross-section portion 39a around the periphery of the middle part of the shaft 26. Also, through holes 41 are formed in the cover tube 27 so as to correspond to respective grooves 44. Synthetic resin 42 is injected into the through holes 41 and the grooves 44, and then cured inside them to fix the through holes 41 to the grooves 44.

The shaft 26 in the energy absorbing intermediate shaft of the present invention has the small-cross-section portion 39a of the diameter $d_{39a}$ which satisfies ($d_{39a}$=(¼–½) $D_{26}$), wherein $D_{26}$ is the diameter of the shaft 26. Note that the diameter $d_{39a}$ of the small-cross-section portion 39a is defined as the outer diameter of the cylindrical middle part of the same. Further, the length $L_{39a}$ of the small-cross-section portion 39a is determined to be at least twice as great as the diameter of the same ($L_{39a} \geq 2d_{39a}$). Note that the length $L_{39a}$ of the small-cross-section portion 39a is defined as the length of said cylindrical middle part, which does not include the arcuate portions 43.

Figure 12:
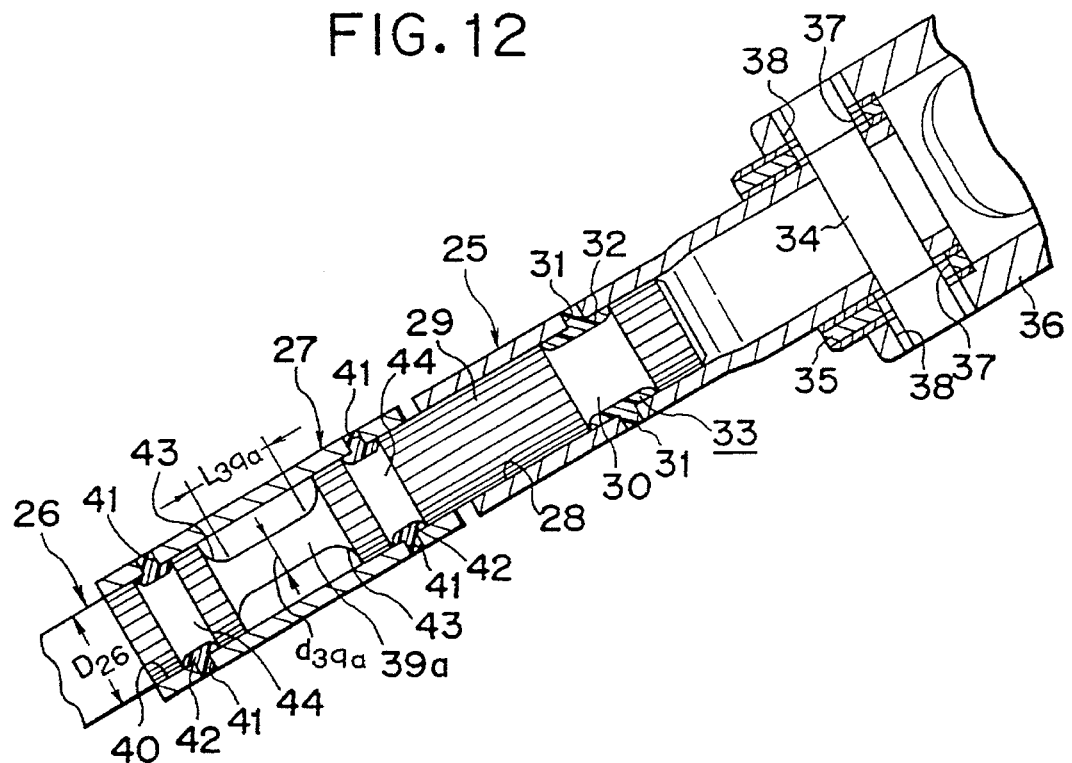
FIG. 12 is a side view showing the longitudinal cross-section of the middle part of another embodiment according to the present invention, which is in the state corresponding to that of FIG. 2.
Figure 13:
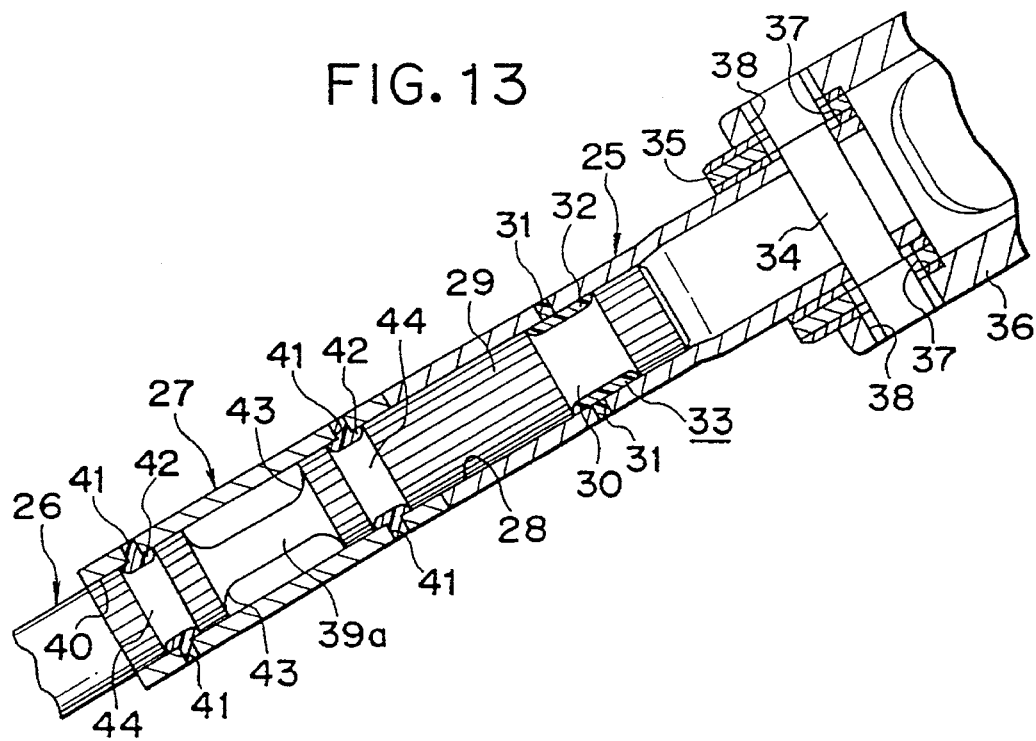
FIG. 13 is a side view showing the same in the state corresponding to that of FIG. 3.
Figure 14:
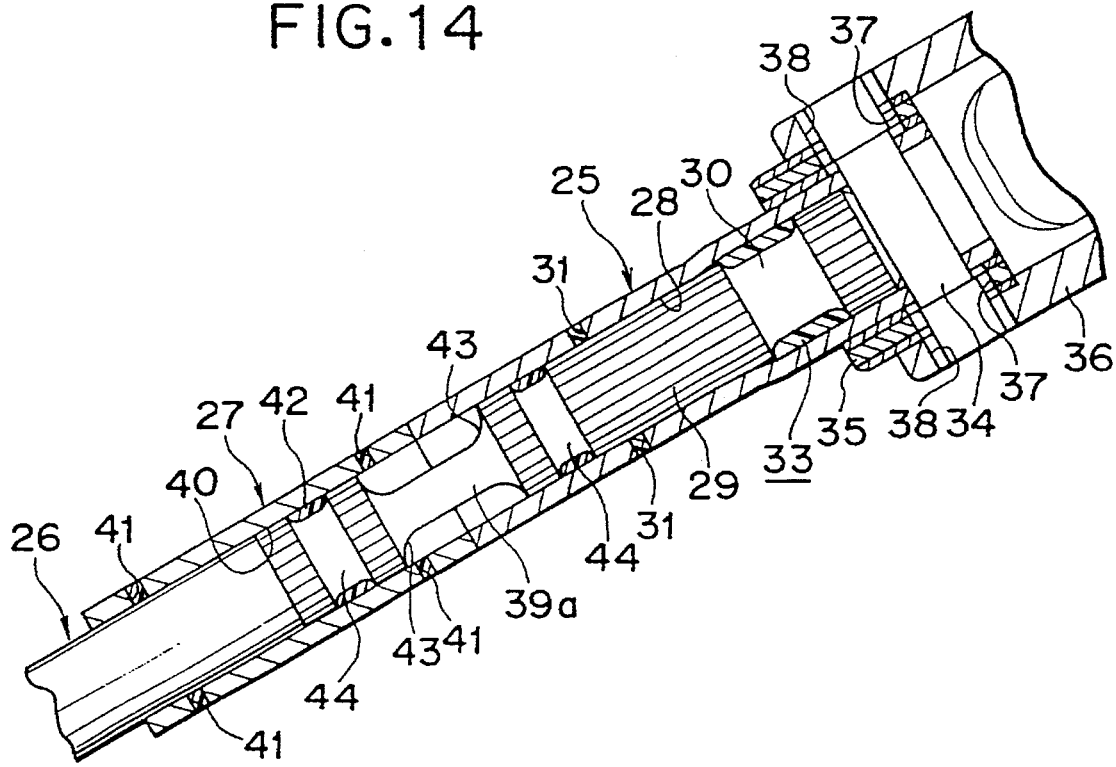
FIG. 14 is a side view showing the same in the state corresponding to that of FIG. 4.

The energy absorbing intermediate shaft of the present invention having the above construction is built in the steering system of an automobile as shown in FIG. 12. Normally the cover tube 27, serving as the reinforcing member covering the entire small-cross-section portion 39a, is fixed around the small-cross-section portion 39a by the synthetic resin 42 so that the shaft does not bend at its small-cross-section portion 39a. The torque for steering is transmitted from the rear part (from the right in FIG. 12) of the shaft 26 to the front part (to the left in FIG. 12) of the same mainly through the cover tube 27.

Figure 15:
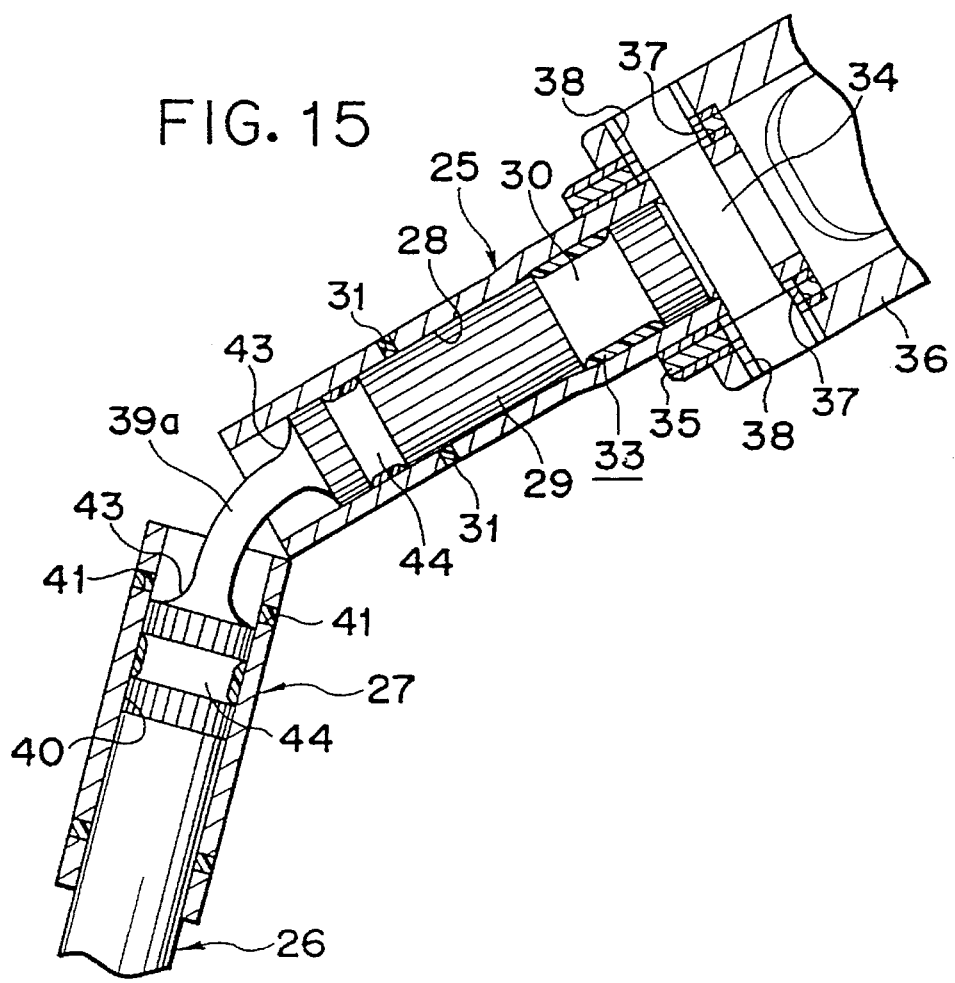
FIG. 15 is a side view showing the same in the state corresponding to that of FIG. 5.

When strong compressive force in the axial direction is given at the time of car crash, the synthetic resin 42 releases the cover tube 27 from the shaft 26. Then, like the embodiment described before, the energy absorbing intermediate shaft of the present embodiment shown in FIG. 12 goes into the state shown in FIG. 13, and further, into the state shown in FIG. 14, where the contact plane of the tube 25 and the cover tube 27 exists around the middle part of the small-cross-section portion 39a. As a result, the energy absorbing intermediate shaft bends as the small-cross-section portion 39a is plastically deformed as shown in FIG. 15. The small-cross-section portion 39, when plastically deformed, absorbs the energy of the car crash and buffers the impact force given to the driver's body. The mechanism of buffering the impact force is the same as that of the embodiment described before. Note that the states of the energy absorbing intermediate shaft of the present embodiment shown in FIGS. 12, 13, 14 and 15 correspond to those of the already mentioned embodiment shown in FIGS. 2, 3, 4 and 5, respectively.

As the energy absorbing intermediate shaft of the present embodiment has the small-cross-section portion whose dimensions are determined as described, the small-cross-section portion 39a does not suffer from excessive force even when the shaft 26 is rotated through the small angle inside the cover tube serving as the reinforcing member. More specifically, according to the present invention, the diameter $d_{39a}$ of the small-cross-section portion 39a is determined to be ¼ to ½ of the diameter $D_{26}$ of the shaft 26, while the length $L_{39a}$ of the small-cross-section portion 39a is determined to be at least twice as great as the diameter $d_{39a}$ of the same. As a result, the torsional tolerance angle of the small-cross-section portion 39a, or the angle within which the small-cross-section portion 39a can be twisted between its both ends without being broken is increased.

As the torsional tolerance angle is increased, only small stress is generated in the small-cross-section portion 39a when the torque elastically deforms the small-cross-section portion 39a. So, even when torque is repeatedly given, the occurrence of damage of the small-cross-section portion 39a caused by metal fatigue can be reduced. Accordingly, the portions of the cover tube 27 serving as the reinforcing member and those of the shaft 26, that is, the male splines 29 and the female splines 28 do not have to be machined with high dimensional accuracy. As a result, the cost needed for machining with high accuracy can be saved and the manufacturing cost of the energy absorbing intermediate shaft can be reduced.

Next an, the experiment on the dimensional conditions of the small-cross-section portion 39a carried out by the inventors will be described. Shafts 26 having small-cross-section portion 39 (see FIG. 2) in the middle parts and those having small-cross-section portion 39a (see FIG. 12) in the middle parts were prepared. Each shaft 26 was given torque of ± 3 kgf•m between its ends. The directions of the torque were switched until a crack (cracks) occurred in the small-cross-section portion 39/39a. Thus, the number of (switching) operations to give torque which caused a crack (cracks) was recorded.

Conditions of the experiments:

material of the shaft 26 was S35C (JIS G 4051 carbon steel for machine structural use);

diameter $D_{26}$ of the shaft 26 was 14.7 mm; and clearances between the shaft 26 and the cover tube 27 (tolerable displacement angle of components 26 and 27) was±0°30'.

The results of the experiments are as shown in the Table below.

TABLE 1

| Experiment No. | $d_{39a}$ | $L_{39a}$ | Number of alternate torsion test |
|---|---|---|---|
| 1 | $D_{26}/2.5$ | $d_{39a}$ | 100,000 |
| 2 | $D_{26}/2$ | $0.75d_{39a}$ | 100,000 |
| 3 | $D_{26}/2.5$ | $2d_{39a}$ | more than 1,000,000 |
| 4 | $D_{26}/3$ | $2.5d_{39a}$ | more than 1,000,000 |
| 5 | $D_{26}/3.5$ | $3d_{39a}$ | more than 1,000,000 |

As is clearly shown in the table, when the diameter $d_{39a}$ and the length $L_{39a}$ of the small-cross-section portion 39a are determined as described before according to the present invention, sufficient durability of the small-cross-section portion 39a is obtained. Note that the maximum length of $L_{39a}$ is not only determined from the viewpoint of the durability of the small-cross-section portion 39a but also restricted according to other conditions such as the facility of manufacturing the cover tube 27, the ability to absorb the impact energy at the time of the bending of the shaft, and so on. In other words, the maximum length varies according to the type, the size, and so on of the car which the energy absorbing intermediate shaft is built in. If the length $L_{39a}$ becomes five or six times as long as the diameter of the small-cross-section portion 39a or even longer, it may not be practically used with respect to the cost, the ability to absorbing impact energy, and so on. On the other hand, the longer the length $L_{39a}$ is made, the better the durability becomes.

According to the present embodiment, the small-cross-section portion should have the cylindrical part. The shapes and the construction of other portions and parts may be, however, modified as those of the embodiment described before.

As the energy absorbing intermediate shaft of the present embodiment has the construction and the functions described above, the same effects as those of the energy absorbing intermediate shaft of the embodiment described before can be obtained. That is, the sufficient ability to absorb impact energy can be realized while the intermediate shaft consists of less components, which facilitates the assembly operations and reduces the manufacturing cost. In addition, according to the energy absorbing intermediate shaft of the present invention, the rotation inhibiting mechanism of the reinforcing member and the shaft does not have to be machined with high dimensional accuracy, which realizes a manufacturing cost lower than that of the embodiment described before.

What is claimed is:

1. An energy absorbing intermediate shaft comprising:

a tube having a first end, and a second end, said first end being open;

a shaft which is partially inserted into said tube from said first end and set so as not to rotate relative to said tube, said shaft having an intermediate part that is not inserted into said tube and a small-cross-section portion formed in said intermediate part;

a displacement restricting portion which is disposed between said shaft and said tube to permit axial displacement of said shaft into said tube only in response to a strong force in an axial direction;

a stopper portion which is disposed toward said second end of said tube to restrict an amount of displacement of said shaft into said tube; and a reinforcing member which is set and positioned around said shaft so as to entirely cover said small-cross-section portion and which can slide axially relative to said shaft during displacement of said shaft into said tube, wherein a length of said tube is determined so that said first end of the tube is disposed at a position which coincides with said small-cross-section portion when the displacement of said shaft is stopped by said stopper portion.

2. An energy absorbing intermediate shaft according to claim 1, wherein said tube and said shaft are engaged with each other via splines.

3. An energy absorbing intermediate shaft according to claim 1, wherein said displacement restricting portion is formed by injecting resin between said shaft and said tube and curing the resin.

4. An energy absorbing intermediate shaft according to claim 1, wherein said reinforcing member is spaced from said tube in said axial direction and is capable of shifting relative to said tube in said axial direction.

5. An energy absorbing intermediate shaft comprising:

a tube having a first end and a second end, said first end being open;

a shaft which is partially inserted into said tube from said first end and set so as not to rotate relative to said tube, said shaft having an intermediate part that is not inserted into said tube and a small-cross-section portion formed in said intermediate part, said small-cross-section portion having an arcuate cross section;

a displacement restricting portion which is disposed between said shaft and said tube to permit axial displacement of said shaft into said tube only in response to a strong force in an axial direction;

a stopper portion which is disposed toward said second end of said tube to restrict an amount of displacement of said shaft into said tube; and a reinforcing member which is provided around said shaft so as to entirely cover said small-cross-section portion and which is spaced from said tube in said axial direction, said reinforcing member being capable of sliding axially relative to said shaft during displacement of said shaft into said tube and shifting relative to said tube in said axial direction, wherein a length of said tube is determined so that said first end of the tube is disposed at a position which coincides with said small-cross-section portion when the displacement of said shaft is stopped by said stopper portion; and a diameter of the small-cross-section portion is ¼ to ½ of a diameter of the shaft, and a length of the small-cross-section portion is at least twice the diameter of the small-cross-section portion.

6. An energy absorbing intermediate shaft comprising:

a tube having a first end and a second end;

a shaft that is partially inserted into said tube from said first end and that is rotatably fixed relative to said tube, said shaft having a reduced-cross-section portion that is not inserted into said tube;

a first movement restricting portion that releasably fixes said shaft relative to said tube in an axial direction, to permit axial movement of said shaft into said tube only in response to a strong axial force;

a stopper portion that stops axial movement of said shaft into said tube; and a reinforcing member that is disposed at a first position relative to said shaft, in which said reinforcing member reinforces said reduced-cross-section portion, and with respect to which said shaft can be displaced during axial movement of said shaft into said tube to bring said reinforcing member to a second position relative to said shaft, in which said reinforcing member does not reinforce said reduced-cross-section portion, wherein said shaft, said tube, said stopper portion, and said reinforcing member are disposed such that, when said stopper portion stops axial movement of said shaft into said tube, said reinforcing member is disposed at said second position relative to said shaft so that said reduced-cross-section portion can bend.

7. An energy absorbing intermediate shaft according to claim 6, wherein said shaft is rotatably fixed relative to said tube via splines.

8. An energy absorbing intermediate shaft according to claim 6, wherein said first movement restricting portion is disposed between said shaft and said tube.

9. An energy absorbing intermediate shaft according to claim 8, wherein said first movement restricting portion includes a resin coupling.

10. An energy absorbing intermediate shaft according to claim 6, further comprising a second movement restricting portion that releasably fixes said reinforcing member relative to said shaft in said axial direction, to permit relative axial movement of said reinforcing member and said shaft only in response to a strong axial force.

11. An energy absorbing intermediate shaft according to claim 10, wherein said second movement restricting portion is disposed between said shaft and said reinforcing member.

12. An energy absorbing intermediate shaft according to claim 11, wherein said second movement restricting portion includes a resin coupling.

13. An energy absorbing intermediate shaft according to claim 10, wherein said first movement restricting portion includes a resin coupling disposed between said shaft and said tube, and said second movement restricting portion includes a resin coupling disposed between said shaft and said reinforcing member.

14. An energy absorbing intermediate shaft according to claim 13, wherein said resin coupling of said first movement restricting portion breaks to permit axial movement of said shaft into said tube, and said resin coupling of said second movement restricting portion breaks to permit relative axial movement of said reinforcing member and said shaft.

15. An energy absorbing intermediate shaft according to claim 6, wherein said stopper portion is disposed near said second end of said tube.

16. An energy absorbing intermediate shaft according to claim 6, wherein said reinforcing member is provided around said shaft to cover said reduced-cross-section portion, and said reinforcing member and said shaft are slidable relative to each other to position said reinforcing member at said second position relative to said shaft.

17. An energy absorbing intermediate shaft according to claim 6, wherein said shaft, said tube, said stopper portion, and said reinforcing member are disposed such that, when said stopper portion stops axial movement of said shaft into said tube, said first end of said tube is disposed at a position that is substantially aligned with said reduced-cross-section portion.

18. An energy absorbing intermediate shaft comprising:

a tube having a first end and a second end;

a shaft that is partially inserted into said tube from said first end and that is rotatably fixed relative to said tube, said shaft having a reduced-cross-section portion that is not inserted into said tube;

a first movement restricting portion that releasably fixes said shaft relative to said tube in an axial direction, to permit axial movement of said shaft into said tube only in response to a strong axial force;

a reinforcing member that is releasably axially fixed relative to said shaft at a first position axially spaced from said tube and in which said reinforcing member reinforces said reduced-cross-section portion, said reinforcing member being movable with said shaft during an initial stage of axial movement of said shaft into said tube to bring said reinforcing member to a second position at which said reinforcing member is stopped by an abutment portion to release said shaft for axial movement relative to said reinforcing member for further axial movement of said shaft into said tube; and a stopper portion that stops axial movement of said shaft into said tube, wherein said shaft, said tube, said reinforcing member, and said stopper portion are disposed such that, when said stopper portion stops axial movement of said shaft into said tube, said shaft is disposed at a position where said reduced-cross-section portion is not reinforced by said reinforcing member so that said reduced-cross-section portion can bend.

19. An energy absorbing intermediate shaft according to claim 18, wherein said reduced-cross-section portion has an arcuate cross section.

20. An energy absorbing intermediate shaft according to claim 18, wherein said reduced-cross-section portion has a diameter that is ¼ to ½ of a diameter of said shaft and a length that is at least twice said diameter of said reduced-cross-section portion.

21. An energy absorbing intermediate shaft according to claim 18, wherein said reinforcing member is releasably axially fixed at said first position relative to said shaft by a second movement restricting portion that permits relative axial movement of said reinforcing member and said shaft only in response to a strong axial force.

22. An energy absorbing intermediate shaft according to claim 18, wherein said shaft, said tube, said reinforcing member, and said stopper portion are disposed such that, when said stopper portion stops axial movement of said shaft into said tube, said reinforcing member is disposed at said second position and said first end of said tube is disposed at a position that is substantially aligned with said reduced-cross-section portion.

* * * * *